United States Patent Office 3,526,450
Patented Sept. 1, 1970

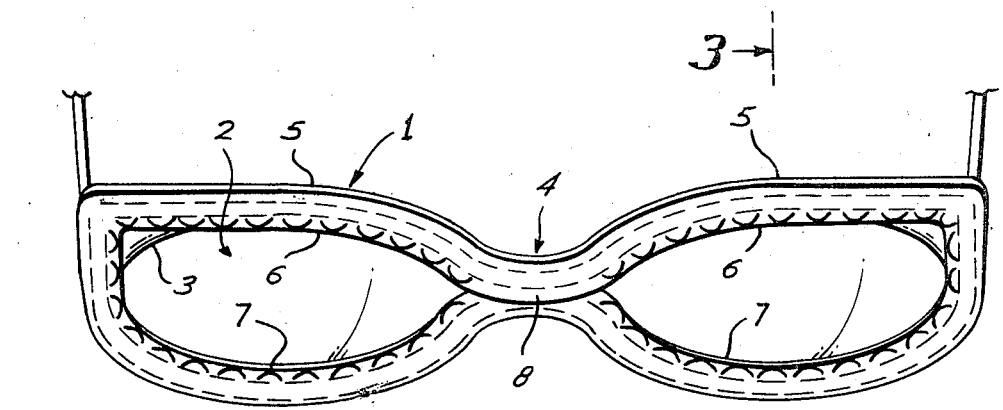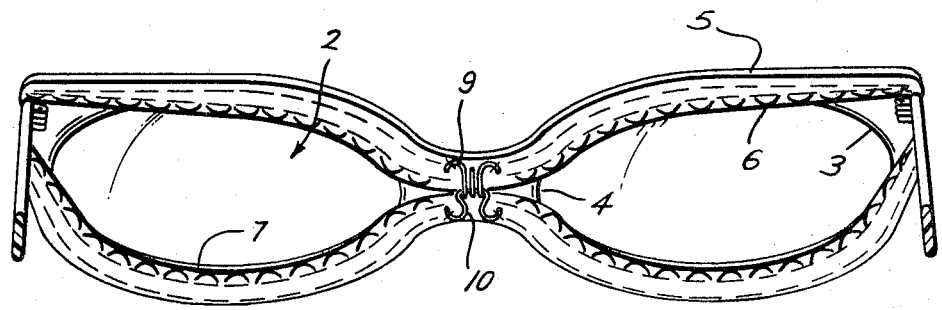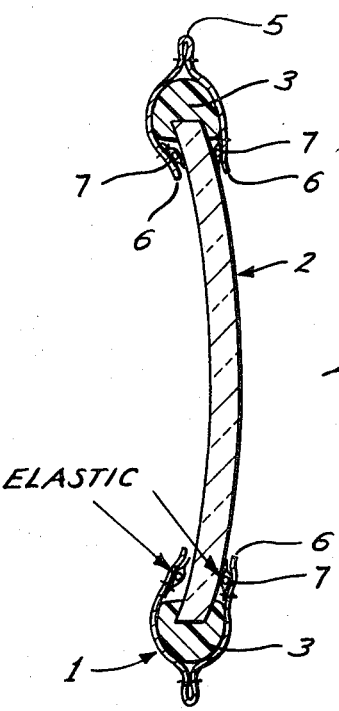

3,526,450
ORNAMENTAL COVERING FOR EYEGLASSES
Margaret P. Berry, 616 S. 28th St., Waco, Tex. 76711
Filed May 6, 1969, Ser. No. 822,168
Int. Cl. G02c 11/02
U.S. Cl. 351—52
1 Claim

ABSTRACT OF THE DISCLOSURE

An ornamental covering, formed of ribbon or the like, which resembles a garter and which is applied to the frame of a pair of eyeglasses, exclusive of its earpieces, including the rims and the connecting bridge.

---

This invention relates to an ornamental covering for eyeglasses, and it concerns more particularly an ornamental covering for the frame of a pair of eyeglasses, exclusive of its earpieces, as hereinafter described.

The invention comprises an ornamental covering for eyeglasses, formed of ribbon or the like, which resembles a garter, and which in use is applied to the frame of a pair of eyeglasses, exclusive of its earpieces, including the rims and the connecting bridge.

The ornamental covering of the invention consists initially of a piece of ribbon which is creased along its longitudinal center line, as by stitching, and has its longitudinal edges puckered or gathered, to form ruffles, by attachment of pieces of elongated elastic material, each substantially shorter than the ribbon in its relaxed, normal position, to the respective edges, as by sewing.

The two ends of the ribbon are connected to form a loop, as by a transverse seam which in the applied position of the covering is on the inside, facing the underside of the bridge.

The crease along the longitudinal center line of the ribbon follows the contour of the peripheral edge of the frame, exclusive of its earpieces, including the rims and the connecting bridge.

Two adjacent edge portions of the ribbon are connected, by sewing, on the front side of the bridge.

Two other edge portions are connected by separable fastening means on the back side of the bridge.

The invention, which is characterized by its novelty appeal, is not altogether frivolous but is both useful and ornamental. It is comparatively inexpensive, at least from the standpoint of manufacturing cost, and is interchangeable with other like frame coverings. It is primarily a luxury item, which is intended to be patented, and therefore exclusive, but does not have to be out of reach of anyone who may want to buy it. It may be made of attractive, expensive looking or inexpensive materials, as desired, and variously ornamented.

The frame covering of the invention is uesful as an eye shade, as when working outdoors without a bonnet, and will soak up perspiration so that it does not obstruct the vision, as by fogging or wetting the lenses.

Like ornamented plastic and metal frames, the invention is also decorative, and it is something to hide behind, the same as heavy frames generally, which tend to obscure character lines, marks of age, wisdom and infirmity, and things like that.

Upon close inspection it will be seen that the invention involves a structure which is not entirely obvious, and which is believed to be patentable.

The invention will be readily understood by referring to the following description and the accompanying drawing, in which:

FIG. 1 is a front view of a pair of eyeglasses having an ornamental covering embodying the invention applied to the frame thereof, exclusive of its earpieces, including the rims and the connecting bridge;

FIG. 2 is a back view thereof; and

FIG. 3 is a transverse sectional view on an enlarged scale taken on the line 3—3 of FIG. 1.

Referring to the drawing, the numeral 1 designates generally an ornamental covering embodying the invention, which as shown is applied to the frame of a pair of eyeglasses, indicated generally by the numeral 2, including the rims 3 and the connecting bridge 4.

The ornamental covering 1 consists initially of a piece of ribbon which is substantially 17 inches long, and which is creased along its longitudinal center line, indicated by the numeral 5, as by stitching, and has its longitudinal edges 6 puckered or gathered, to form ruffles, by attachment of pieces of elongated elastic material, shown best in FIG. 3 and indicated by the numerals 7, to the respective edges 6, as by sewing.

The pieces of elongated elastic material 7 are each substantially 11 inches long, substantially shorter than the ribbon 1 in their relaxed, normal positions.

The two ends of the ribbon 1 are connected to form a loop, as by a transverse seam which, in the applied position of the covering, shown in FIGS. 1 and 2 is on the inside, facing the under side of the bridge 4.

The crease along the longitudinal center line 5 of the ribbon 1 follows the contour of the peripheral edge of the frame 2, exclusive of its earpieces, including the rims 3 and the connecting bridge 4.

Two adjacent edge portions of the ribbon 1 are connected, by sewing, as at 8, along the front side of the bridge 4.

Two other edge portions, shown in FIG. 2 are connected by a hook 9 and a corresponding eye 10 on the back side of the bridge 4. The hook 9 advantageously may be positioned at the top.

I claim:

1. An ornamental covering for eyeglasses, formed of ribbon or the like, which resembles a garter, and which in use is applied to the frame of a pair of eyeglasses, exclusive of its earpieces, including the rims and the connecting bridge, the covering consisting initially of a piece of ribbon which is creased along its longitudinal center line, as by stitching, and has its longitudinal edges puckered or gathered, to form ruffles, by attachment of pieces of elongated elastic material, each substantially shorter than the ribbon in its relaxed, normal position, to the respective edges, as by sewing, the two ends of the ribbon being connected to form a loop, as by a transverse seam which in the applied position of the covering is on the inside, facing the under side of the bridge, the crease along the longitudinal center line of the ribbon following the contour of the peripheral edge of the frame, exclusive of its earpieces, including the rims and the connecting bridge, two adjacent edge portions of the ribbon being connected, by sewing, on the front side of the bridge, and two other edge portions being connected by separable fastening means on the back side of the bridge.

References Cited

UNITED STATES PATENTS 2,566,236    8/1951    Meddoff _____ 351—52

DAVID SCHONBERG, Primary Examiner

J. W. LEONARD, Assistant Examiner

U.S. Cl. X.R.
351—62